United States Patent

[11] 3,584,730

| [72] | Inventor | Hubert Elineau<br>Versailles, France |
|---|---|---|
| [21] | Appl. No. | 786,210 |
| [22] | Filed | Dec. 23, 1968 |
| [45] | Patented | June 15, 1971 |
| [73] | Assignee | Etablissements R. Senard & Fils<br>Maromme, Seine-Maritime, France |
| [32] | Priority | Dec. 22, 1967 |
| [33] | | France |
| [31] | | 7 204 |

[54] INSTALLATION FOR THE TRANSFERRING OF LONG OBJECTS TO BE USED PARTICULARLY FOR THE SERVICE OF MACHINES FOR BINDING BARS
2 Claims, 4 Drawing Figs.

[52] U.S. Cl.................................................. 198/106,
198/219
[51] Int. Cl..................................................... B65g 37/00
[50] Field of Search............................................. 198/32,
219, 106; 263/6 A

[56] References Cited
UNITED STATES PATENTS

| 1,448,395 | 3/1923 | Foell............................. | 198/219X |
| 2,983,498 | 5/1961 | MacGregor................... | 263/6(A) |
| 3,168,190 | 2/1965 | Nienstedt..................... | 198/106X |
| 3,265,187 | 8/1966 | Hein et al. ................... | 198/219X |

FOREIGN PATENTS

| 313,546 | 7/1919 | Germany...................... | 198/219 |

*Primary Examiner*—Albert J. Makay
*Attorney*—Sparrow and Sparrow

ABSTRACT: A chair conveyor, specially for transferring elongated objects and/or serving machines for binding bundles of bars or sections. The conveyor has two parallel endless chains, means for imparting motion thereto and plates to interconnect the two endless chains. Spaced apart supports for the transported objects are provided which are connected to the interconnecting plates by pedestals. The chain conveyor can be associated to and loaded by a step by step conveyor whose movable beams may pass between adjacent supports in the chain conveyor.

PATENTED JUN 15 1971
3,584,730
SHEET 1 OF 2
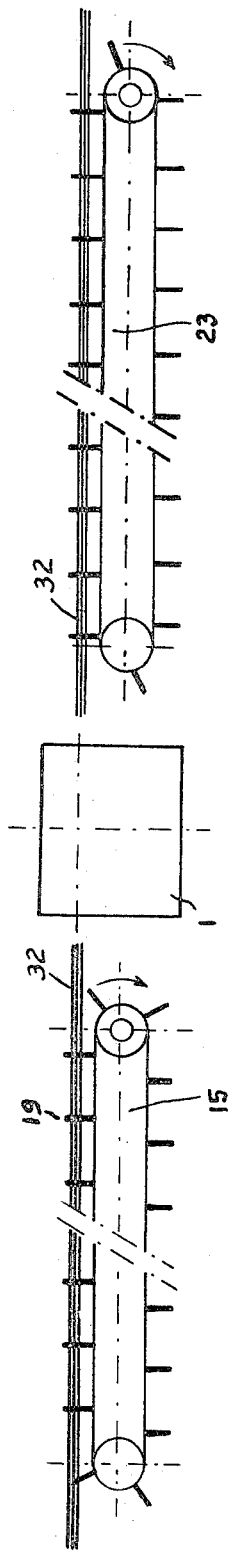
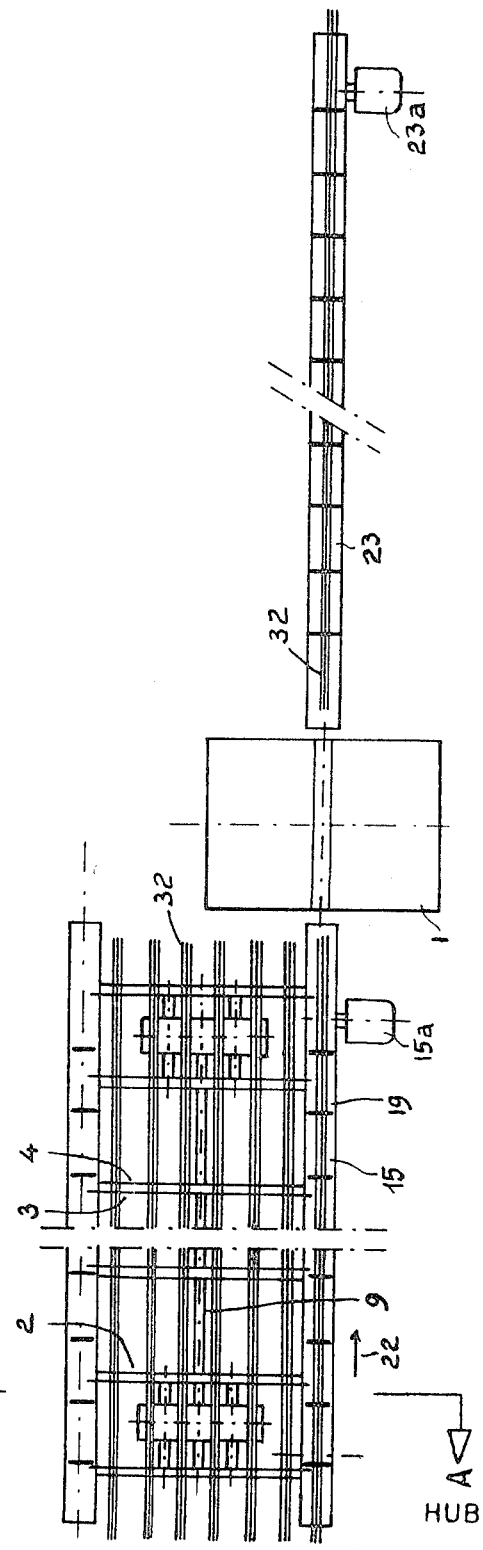
INVENTOR
HUBERT ELINEAU

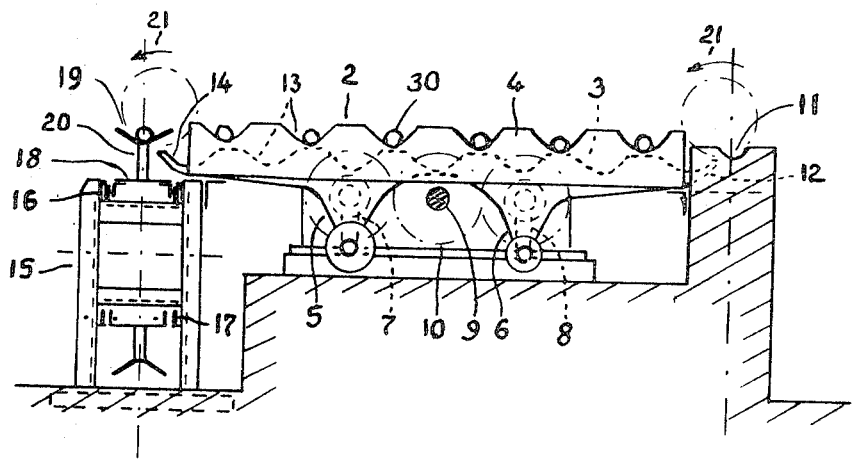

INSTALLATION FOR THE TRANSFERRING OF LONG OBJECTS TO BE USED PARTICULARLY FOR THE SERVICE OF MACHINES FOR BINDING BARS

The present invention relates to a chair conveyor for the transfering of elongated objects such as rolled bars or bundles of bars to be used particularly for the service of machines for binding bundles of bars or sections.

For serving of such machines, roller conveyors are generally used, the disadvantages of which is their rather complicated and very expensive construction, since the feed of the binding machines is performed in a discontinuous manner which results in a succession of starting and stopping of the conveyors requiring special equipment and causing a considerable waste of driving power.

The object of the present invention is to remove these disadvantages by providing a device which complies better than the existing devices with the requirements of the practice. A further object of the invention is to provide a chain conveyor disposed to be loaded by means of a rotating mechanism, such as the movable beams of a rack conveyor. Another object of the invention is to provide a device for transferring elongated objects and comprising a step by step conveyor and a chain conveyor disposed to be loaded by a rotating mechanism of said step conveyor.

According to the invention, the device for the transfering of elongated objects comprises a "pilgrim's step" conveyor and a chain conveyor. According to the invention, the chain conveyor for transporting objects consists of two parallel endless chains, means for imparting motion thereto, plates substantially at right angles to the plane of, and interconnecting the endless chains, spaced apart supporting members for the objects and of pedestals to connect the supporting members to the plates. The paths given to objects by the conveyors having one common part owing to the fact that the ends of the mobile stringers of the pilgrim's step conveyor, during their motion, pass between the chain conveyor members supporting the objects.

By way of example and in order to facilitate the understanding of the invention, a description is given hereinafter of particular embodiments of the invention, represented in a schematic and nonlimiting manner in the attached drawing in which:

FIGS. 1 and 2 respectively show in partial side elevational and plan views, the device for the transfer of elongated objects, according to the invention;

FIG. 2 shows a vertical section along the plane A.A. of FIG. 2; and

FIG. 4, analogous to FIG. 3, shows a vertical section of a variant of such installation.

With reference to the drawing there is shown a device comprising a chain conveyor 15 according to the invention intended to serve a machine 1 for binding bundles of bars 30 or sections 31, i.e. the device feeds unbound bars 30 or sections 31. To said machine. As is known, the bundles are held stationary in machine 1 at the required place and for the time necessary to the laying of the binding.

The device comprises a "pilgrim's step" conveyor 2, consisting of a number of movable parallel beams 3 and of stationary beams 4. The movable beams 3 are supported by arms 5, 6 provided at their ends with bearings in which the trunnions of parallel cranks 7, 8 rotate, driven by a shaft 9 and by a suitable motor with one or several gears 10 ensuring the synchronous rotation of the cranks. The movement of movable beams 3 is therefore a motion of circular translation.

By any appropriate means, the bars 30, bundles of bars 32 or sections 31 are brought at point 11 at one end of conveyor 2 at a level above the lower part of the circular paths of the ends 12 of beams 3. Beams 3 and stationary beams 4 are provided with notches or hollows 13 on their part. Bars 30 and bundles 32 brought in at point 11, raised in the notch of end 12 of the movable beams 3, are deposited in the first notch of stationary beams 4, then raised again to progress step-by-step in the notches of the movable and stationary beams alternatingly and eventually reach the end 14 of the beams 3 which move in the direction of the arrows 21.

According to the invention, a chain conveyor 15, running perpendicularly to the "pilgrim's step" conveyor 2, is placed on the side of the ends 14 of beams 3. Conveyor 15 comprises two parallel endless chains 16,17, connected by metal plates 18 disposed substantially at right angles to said chains chains 16, 17 are driven through a suitable mechanism by a motor 15. Plates 18 support at certain distances through-like members 19 connected with plates 18 by pedestals 20.

According to the invention, the spacing between adjacent troughlike members 19 and the height of pedestals 20 is selected in such manner that the ends 14 of movable beams 3 of step-by-step conveyor 2 are disposed to pass between two adjacent members 19 and connecting metal plates 18 and endless chains 16,17. The bundles contained in end notches 14 of movable beams 3 are thus deposited in members 19 and are transferred to the input of binding machine 1 by chain conveyor 15 conversely, objects may be transferred from chain conveyors 15 to step-by-step conveyor 2, with movable beams 3 moving in the opposite direction of the one shown by arrow 21. The previously described device may be complemented by another chain conveyor 23 similar to conveyor 15, placed in the alignment of the latter at the output end of machine 1 and driven by a motor 23a so that the transfer speed of conveyors 15 and 23 may be identical. In cooperation with conveyor 15 or alone, conveyor 23 empties the bundle of bars or sections bound by machine 1.

Of course, according to their size all the bars which will constitute the bundle to be bound, may be taken in at 11 by the notches of ends 12 of movable beams 3. In this case the conveyor 2 will make a single revolution per bound bundle.

As a variant, the upper surface of the stationary beams 24 and of the movable beams 25 of the pilgrim's step conveyor 26 of this device may be plan which permits the transfer step-by-step of bundles 27. In this case, the associated chain conveyor 28 is provided with flat plates 29 replacing the previously described through-like members. The chain conveyor according to the invention can be loaded by means of any rotating mechanism similar to the movable beams described above.

Compared with the known roller conveyors, the chain conveyor according to the invention has numerous advantages such as: a lower cost price, lower power consumption, a simplified construction due to the elimination of devices for stopping the bars an improved support and guiding for the transferred objects and thus eliminating accidental bending and warping of thin bars.

The invention is obviously not limited to the modes of application and embodiments described above but it is understood that various changes may be made within the spirit and scope of the appended claims.

What I claim is:

1. In a device for transferring substantially elongated objects such as metal bars or bundles of bars, said device comprising a step-by-step conveyor having parallel sets of both stationary and movable beams, first means to impart a motion to said movable beams in a closed curved path in a plane substantially parallel to said stationary and movable beams, a chain conveyor disposed substantially at right angle to said step-by-step conveyor, said chain conveyor comprising two parallel endless chains, second means for imparting motion thereto, a plurality of plates substantially at right angles to said chains, said plates disposed for interconnecting said two endless parallel chains, a plurality of spaced apart supporting troughs for said elongated objects and pedestals disposed for connecting said troughs to said interconnecting plates, the spacing between said troughs, and the height of said pedestals being determined to permit passing of the ends of said movable beams in said step-by-step conveyor between two of said adjacent troughs.

2. A device according to claim 1 for servicing a binding machine for metal bars, said device comprising a first chain conveyor disposed for feeding said bars to the input of said binding machine, a second chain conveyor disposed for carrying said bars from the output of said machine, and means disposed for synchronizing the transferring speeds of said first and said second conveyor.